(12) United States Patent
Liou et al.

(10) Patent No.: US 10,690,232 B2
(45) Date of Patent: Jun. 23, 2020

(54) MACHINE AND GEARBOX SYSTEM AND COOLING THEREFOR

(71) Applicant: ABB Schweiz AG, Baden (CH)

(72) Inventors: Joe J. Liou, Windsor, CT (US); Stefan Rakuff, Windsor, CT (US); Nolan W. Nicholas, Granby, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/994,268

(22) Filed: May 31, 2018

(65) Prior Publication Data

US 2019/0368595 A1 Dec. 5, 2019

(51) Int. Cl.

| F16H 57/04 | (2010.01) |
|---|---|
| F04D 29/42 | (2006.01) |
| F04D 29/44 | (2006.01) |
| F04D 29/54 | (2006.01) |
| F16H 57/02 | (2012.01) |

(Continued)

(52) U.S. Cl.
CPC ..... *F16H 57/0416* (2013.01); *F04D 29/4226* (2013.01); *F04D 29/441* (2013.01); *F04D 29/541* (2013.01); *F05B 2260/2241* (2013.01); *F16H 2057/02026* (2013.01);
(Continued)

(58) Field of Classification Search
CPC ........ F16H 57/027; F16H 57/03; F16H 57/04; F16H 57/0412; F16H 57/0416; F16H 2057/02026; F16H 57/0415; F16H 41/30; F16H 57/025; F16H 2057/02073; F04D 29/441; F04D 29/4226; F04D 29/541; F05B 2260/2241; Y10T 74/2189; F16D 2300/0212
See application file for complete search history.

(56) References Cited

U.S. PATENT DOCUMENTS

| 4,061,188 A | 12/1977 | Beck et al. |
| 4,872,502 A * | 10/1989 | Holzman ............ F16H 57/0415 |
| | | 165/299 |
| 5,724,925 A * | 3/1998 | Ito .......................... B60K 11/02 |
| | | 123/41.49 |
| 8,454,322 B2 | 6/2013 | Gammack et al. |

(Continued)

FOREIGN PATENT DOCUMENTS

| DE | 102012025596 A1 | 1/2014 |
| GB | 546760 A | 7/1942 |
| JP | 2016135026 A | 7/2016 |

OTHER PUBLICATIONS

European Patent Office, Extended European Search Report in corresponding application No. 19177699.6, dated Oct. 18, 2019, 17 pp.

*Primary Examiner* — Jeremy R Severson
(74) *Attorney, Agent, or Firm* — Taft Stettinius & Hollister LLP; J. Bruce Schelkopf

(57) ABSTRACT

A system includes a gearbox having an external surface; a fan or impeller constructed to generate a first cooling airflow when rotated; a shroud operative to guide and discharge the first cooling airflow over the external surface and cool the gearbox, wherein at least a portion of the shroud is spaced apart from the gearbox and disposed radially outward of the external surface; and a flow entrainment structure coupled to the gearbox and/or the shroud, wherein the flow entrainment structure is constructed to entrain a second cooling airflow and combine the second cooling airflow with the first cooling airflow to form a combined cooling airflow directed across the external surface to cool the gearbox.

17 Claims, 8 Drawing Sheets

(51) Int. Cl.
 *H02K 5/18* (2006.01)
 *H02K 9/06* (2006.01)
(52) U.S. Cl.
 CPC ...... *F16H 2057/02034* (2013.01); *H02K 5/18* (2013.01); *H02K 9/06* (2013.01); *Y10T 74/2189* (2015.01)

(56) References Cited

U.S. PATENT DOCUMENTS

| | | | |
|---|---|---|---|
| 9,599,406 B2* | 3/2017 | Tietyen | F28D 1/024 |
| 9,756,759 B2* | 9/2017 | Kimura | F16H 57/0416 |
| 9,951,859 B2* | 4/2018 | Becka | F16H 57/031 |
| 2015/0192197 A1* | 7/2015 | Volker | F16H 57/0416 415/121.3 |
| 2016/0222886 A1* | 8/2016 | Riehle | F02C 7/18 |
| 2016/0290348 A1 | 10/2016 | Mornan et al. | |

* cited by examiner

MACHINE AND GEARBOX SYSTEM AND COOLING THEREFOR

TECHNICAL FIELD

The present application generally relates to machines, and more particularly, but not exclusively, to gearboxes and cooling systems therefor.

BACKGROUND

Machines such as gearboxes remain an area of interest. Some existing systems have various shortcomings, drawbacks and disadvantages relative to certain applications. For example, in some machines or gearbox systems, improvements in machine or gearbox cooling may be made. Accordingly, there remains a need for further contributions in this area of technology.

SUMMARY

One embodiment of the present invention is a unique system including a machine. Another embodiment is a unique system including a gearbox. Other embodiments include apparatuses, systems, devices, hardware, methods, and combinations for machines and gearboxes. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
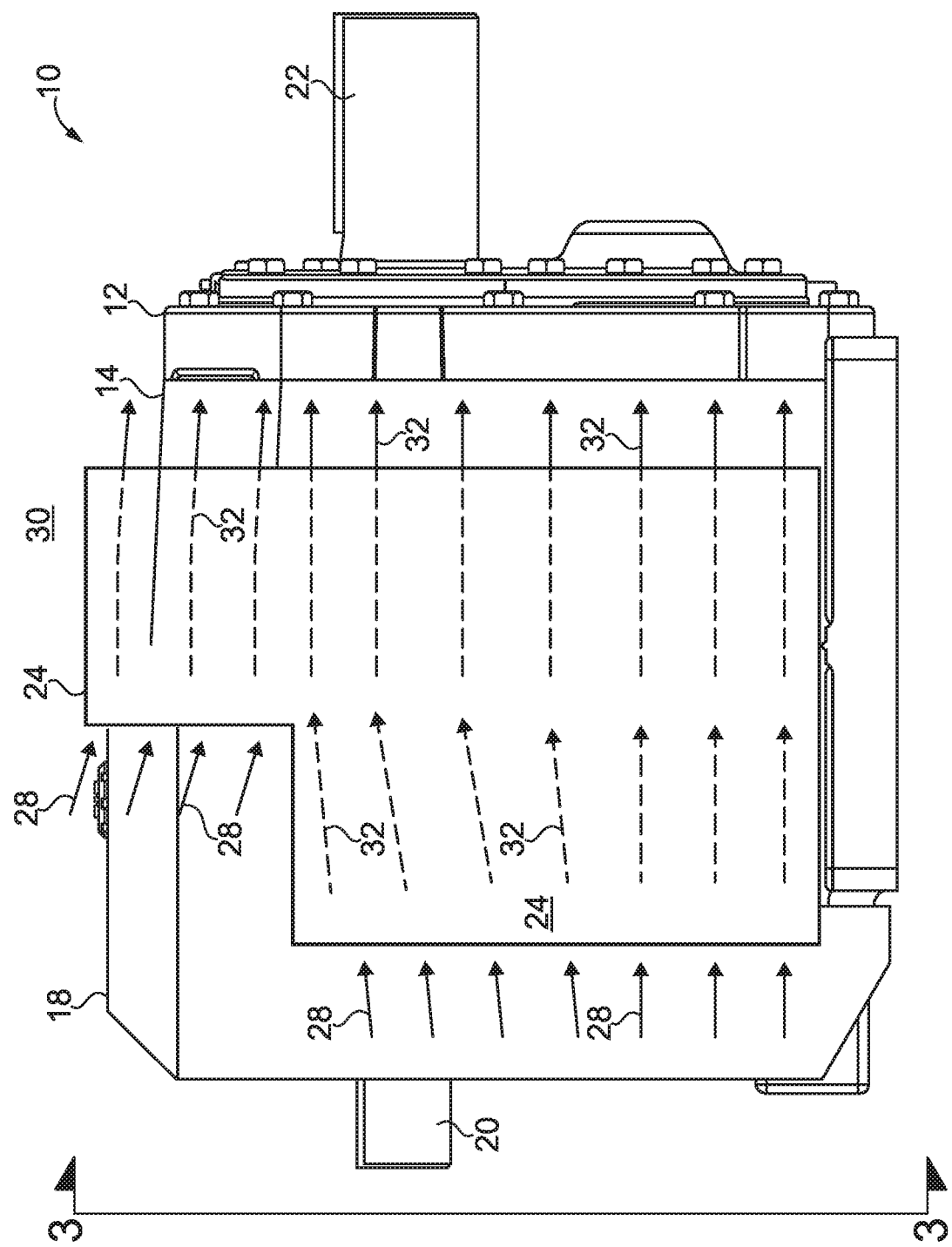
FIG. 1 illustrates some aspects of a non-limiting example of a machine system in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
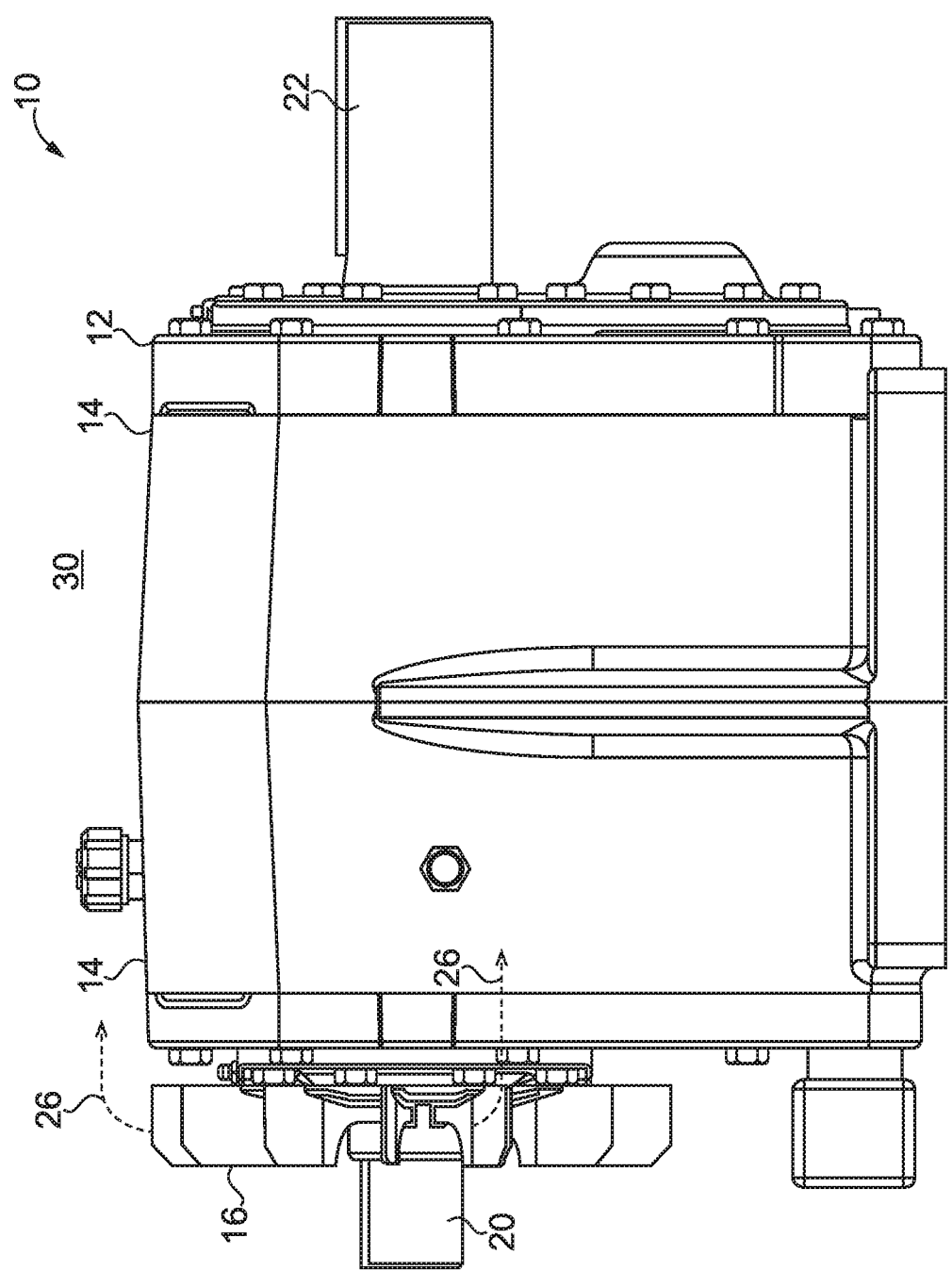
FIG. 2 illustrates some aspects of a non-limiting example of the machine system of claim 1, wherein a shroud is removed to illustrate a fan.

Referring to FIGS. 1 and 2, some aspects of a non-limiting example of a machine system 10 are illustrated in accordance with an embodiment of the present invention. System 10 includes a machine in the form of a gearbox 12 having an external surface 14, a cooling airflow generator 16, a shroud 18, an input shaft 20, an output shaft 22 and a flow inducer, e.g., flow entrainment structure 24. FIG. 2 illustrates gearbox system 10 with shroud 18 removed to illustrate cooling airflow generator 16. In other embodiments, the machine may take other forms. For example, in some embodiments, the machine may be an electrical machine, such as a motor, generator or motor/generator in addition to or in place of a gearbox.

In one form, gearbox 12 is a gear reducer or speed reducing gearbox, wherein output shaft 22 rotates slower than input shaft 20. In other embodiments, gearbox 12 may be a speed increaser or speed increasing gearbox, or any other type of gearbox or transmission. In one form, cooling airflow generator 16 is coupled to input shaft 20. In other embodiments, cooling airflow generator 16 may alternatively be coupled to output shaft 22 or may be powered by another shaft, drive system or motor. In one form, cooling airflow generator 16 is a fan, e.g., a radial or centrifugal fan, or an impeller. In other embodiments, cooling airflow generator 16 may take other forms. Cooling airflow generator 16 is constructed to generate a cooling airflow 26 when rotated, e.g., by input shaft 20.

Shroud 18 is a flow guide structure operative to guide cooling airflow 26 across the portion of external surface 14 covered by shroud 18, and to discharge and guide cooling airflow 26 over the portion of external surface 14 not covered by shroud 18, to cool gearbox 12 using cooling airflow 26. In some embodiments, external surface 14 may be a finned surface, i.e., a surface having cooling fins (not shown) extending therefrom, in which case, shroud 18 is operative to guide cooling airflow 26 along and through the cooling fins or across the cooling fins, e.g., depending upon the orientation of the cooling fins. In various embodiments, shroud 18 or at least a portion of shroud 18 is spaced apart from gearbox 12, e.g., spaced apart from external surface 14, and disposed radially outward of external surface 14, in order to direct cooling airflow 26 along external surface 14.

In one form, flow entrainment structure 24 is coupled to or mounted on shroud 18. In other embodiments, flow entrainment structure 24 may be coupled to or mounted directly onto gearbox 12, e.g., onto external surface 14. Flow entrainment structure 24 is constructed to induce additional cooling airflow 28, i.e., to entrain additional cooling airflow 28 from an environment 30 in which the gearbox 12 is located, for cooling gearbox 12. In a particular embodiment, flow entrainment structure 24 is constructed to entrain cooling airflow 28 from environment 30 using cooling airflow 26 discharged from shroud 18. Cooling airflow 28 is cooler than cooling airflow 26 because prior to exiting shroud 18, cooling airflow 26 has already been heated somewhat by extracting heat from gearbox 12, e.g., from the portion of external surface 14 that is covered by shroud 18. Flow entrainment structure 24 provides additional cooling to gearbox 12 using the additional cooling airflow 28. For example, in some embodiments, cooling airflow 28 is merged or combined with the cooling airflow 26 to form a combined cooling airflow 32. In some embodiments, e.g., wherein the external surface 14 is a finned surface, i.e., a surface having cooling fins (not shown), the combined cooling airflow 32 may be achieved sooner by the formation of a turbulent airflow. The combined cooling airflow 32 is directed across or along external surface 14 to cool gearbox 12 by shroud 18 and flow entrainment structure 24. In various embodiments, flow entrainment structure 24 may be continuous, or may be segmented, e.g., segments that are spaced apart from each other.

Figure 3:
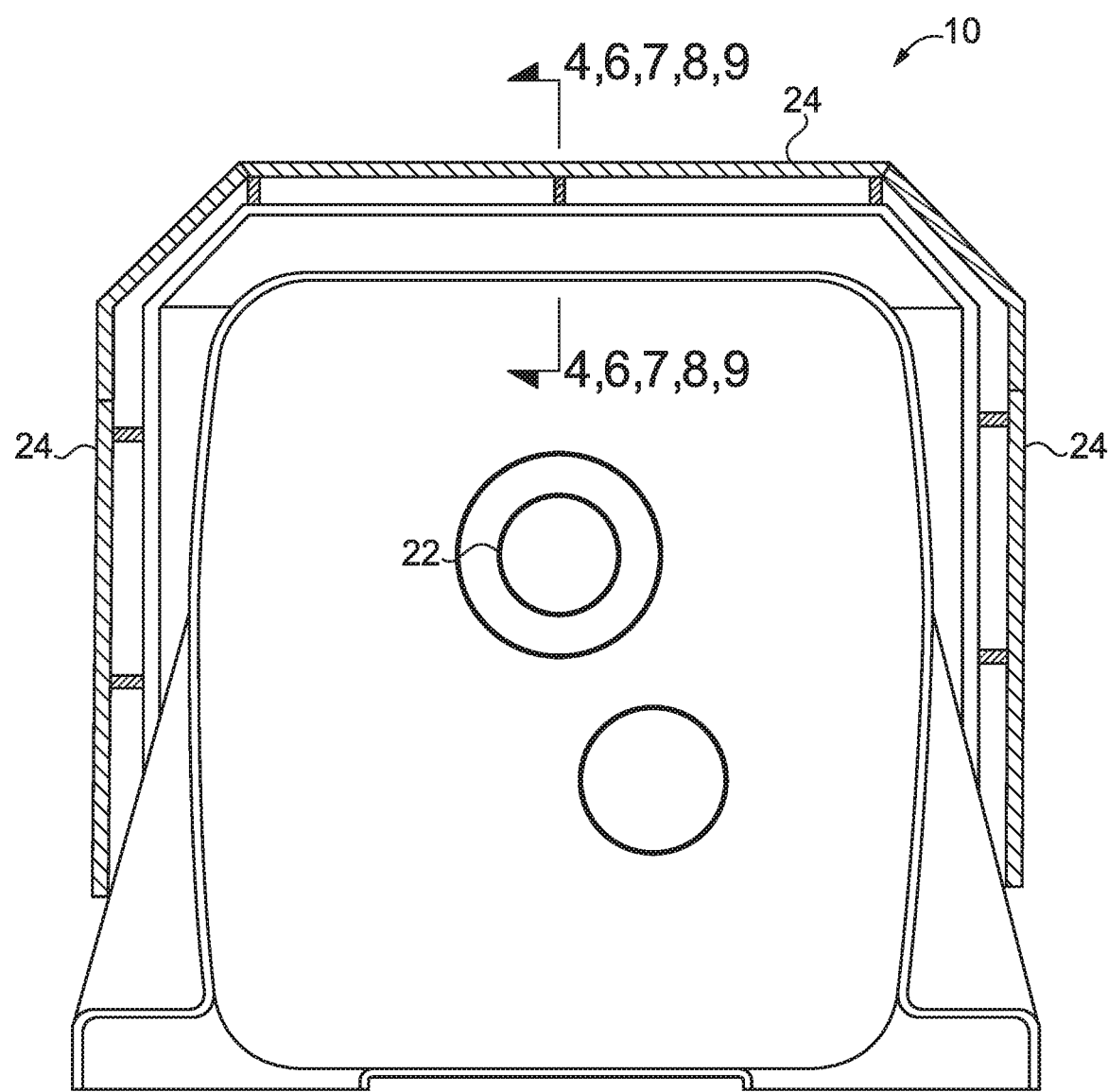
FIG. 3 illustrates some aspects of a non-limiting example of a machine, e.g., a gearbox, having a flow entrainment structure in accordance with an embodiment of the present invention.
Figure 4:
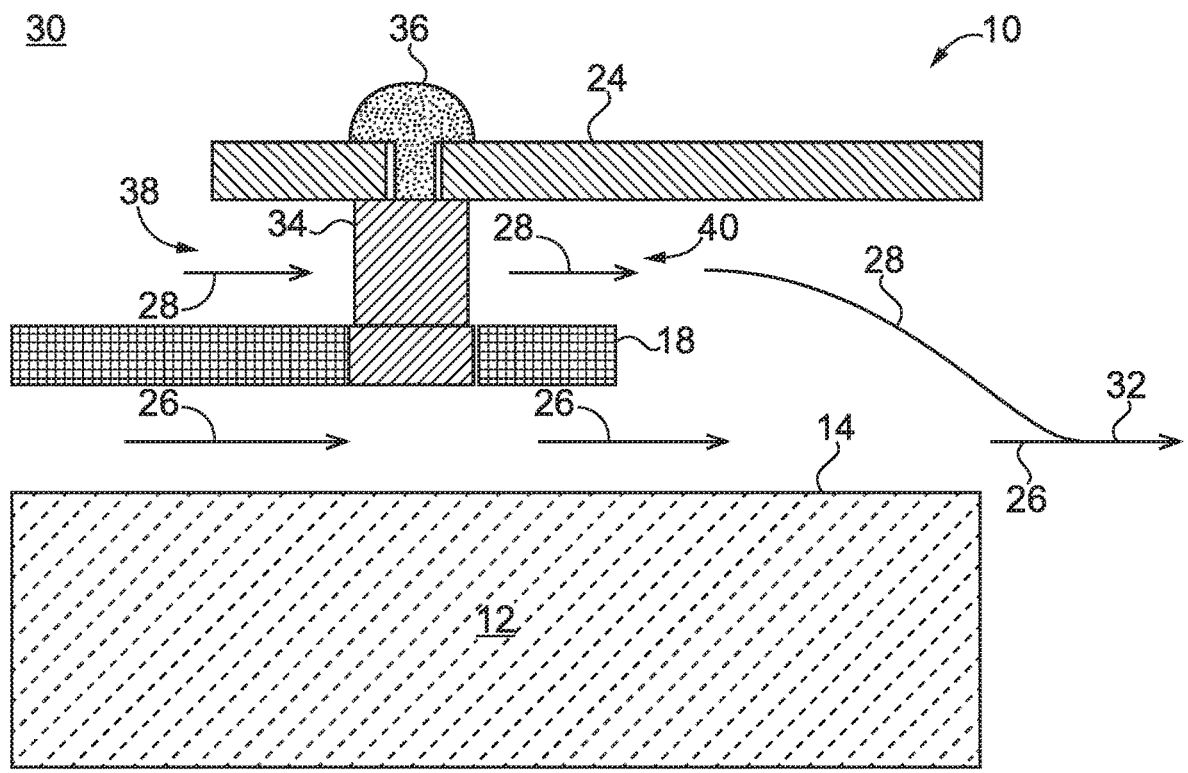
FIG. 4 is a sectional view of some aspects of a non-limiting example of the flow entrainment structure of FIG. 3 in accordance with an embodiment of the present invention.

Referring also to FIGS. 3 and 4, some aspects of a non-limiting example of a machine, e.g., gearbox 12, with flow entrainment structure 24 is illustrated in accordance with an embodiment of the present invention. Flow entrainment structure 24 is spaced apart from gearbox 12. In the embodiment of FIGS. 3 and 4, flow entrainment structure 24 is mounted on shroud 18 using standoffs 34 and fasteners 36. Standoffs 34 are constructed to radially space flow entrainment structure 24 apart from shroud 18. Additional cooling airflow 28 is drawn into flow entrainment structure 24 by cooling airflow 26. Flow entrainment structure 24 admits the additional cooling airflow 28 via an inlet 38. The additional cooling airflow 28 exits flow entrainment structure 24 via an outlet 40. The additional cooling airflow 28 is entrained by the cooling airflow 26 discharged from shroud 18 and together with cooling airflow 26 forms combined airflow 32. In the embodiment of FIGS. 3 and 4, flow entrainment structure 24 is a flat plate. In other embodiments, flow entrainment structure 24 may have other geometric forms, e.g., one or more of the geometric forms illustrated and described herein, or other geometric forms. In the embodiment of FIGS. 3 and 4, flow entrainment structure 24 entrains additional cooling airflow 28 based on the Coanda effect. Other embodiments may entrain additional cooling airflow 28 based on the Coanda effect and/or the Bernoulli principle/Venturi effect.

Figure 5:
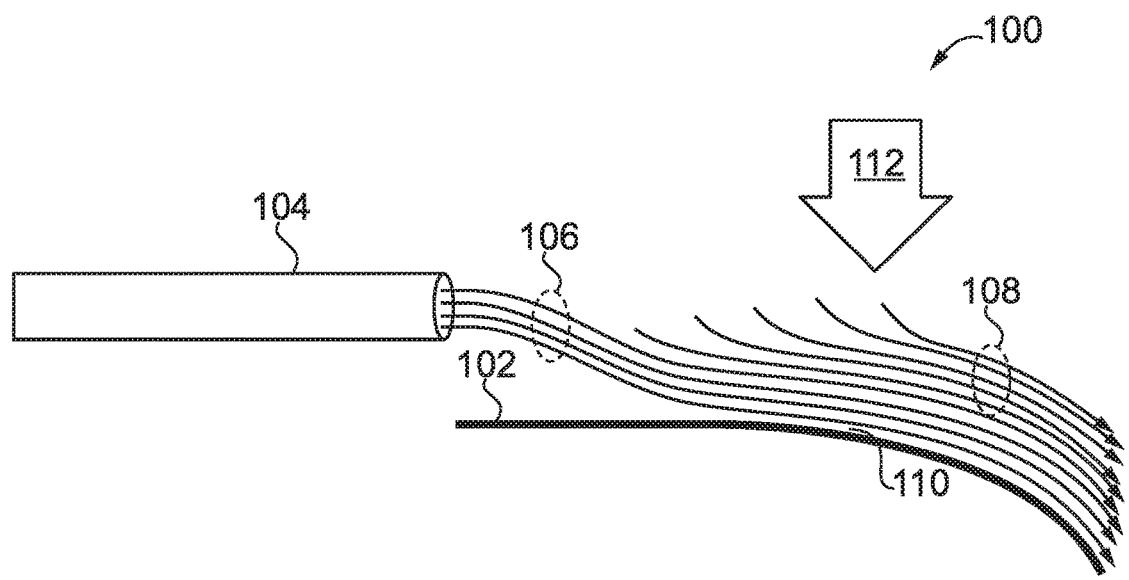
FIG. 5 schematically illustrates some aspects of a non-limiting example of the Coanda effect that may be employed in accordance with some embodiments of the present invention.

Referring also to FIG. 5, some aspects of a non-limiting example 100 of a Coanda effect that may be employed in some embodiments of the present invention is schematically illustrated. The example 100 uses a curved surface 102, although the effect also works with a flat or straight surface. A source 104 of a fluid such as air directs a flow 106 along surface 102. The flow of air 106 entrains surrounding air 108, resulting in a low-pressure region surrounding the flow of air 106. The surrounding air 108 fills in the low-pressure region, attaching some of the surrounding air 108 to the flow of air 106, resulting in a combined airflow. Because of the proximity of surface 102 to flow of air 106, and flow of air 106 being arranged roughly parallel to surface 102, other air cannot readily fill in and neutralize the low-pressure zone 110 between the flow of air 106 and surface 102, and hence, the low-pressure zone 110 between the flow of air 106 and surface 102 remains. Ambient pressure 112 in combination with low-pressure zone 110 drive the combined flow (flow of air 106 and the entrained surrounding air 108) toward surface 102, thus attaching the combined flow to surface 102.

Figure 6:
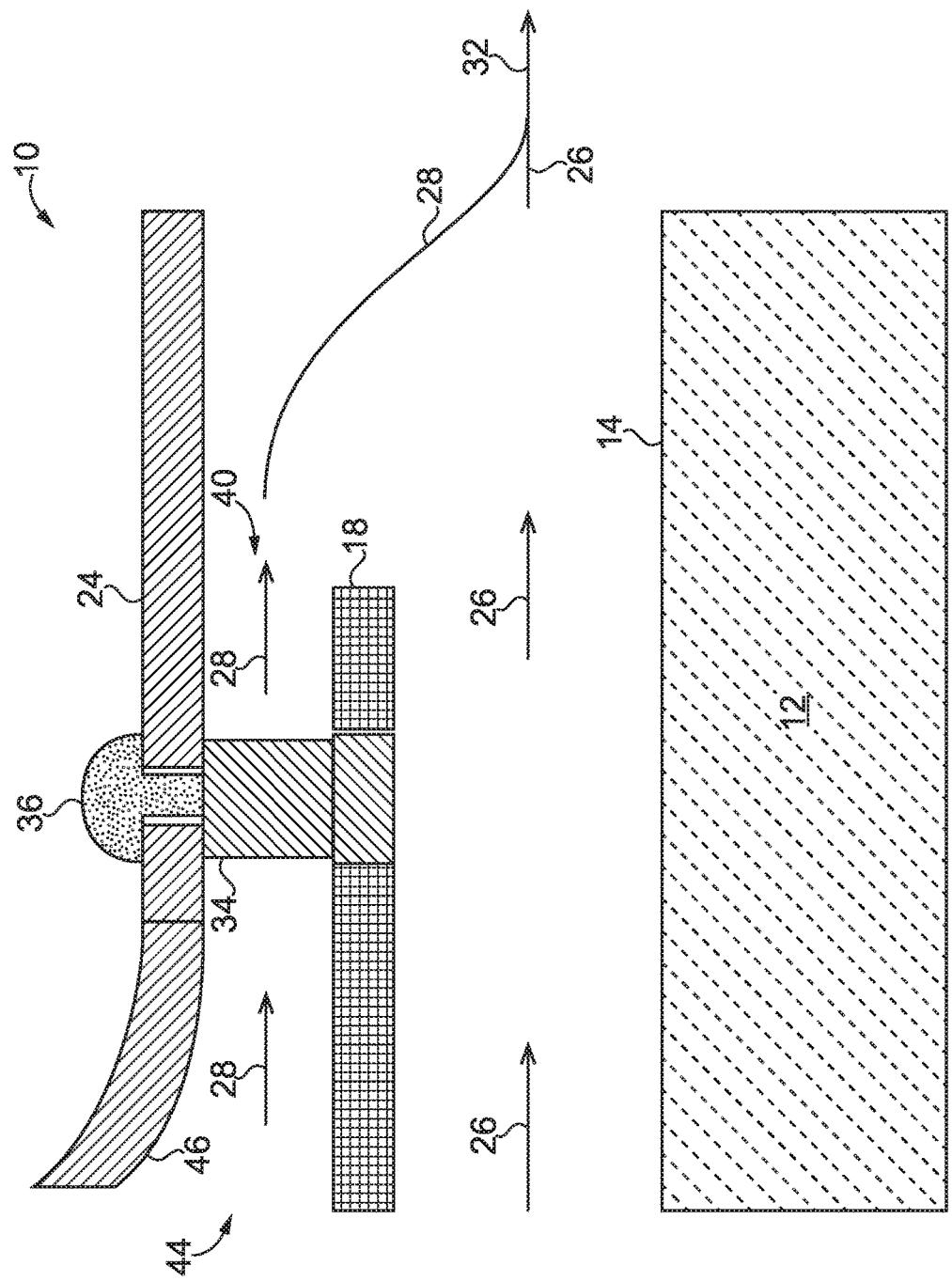
FIG. 6 is a sectional view schematically illustrating some aspects of another non-limiting example of a flow entrainment structure in accordance with an embodiment of the present invention.

Referring also to FIG. 6, some aspects of another non-limiting example of a machine, e.g., gearbox 12, with flow entrainment structure 24 is illustrated in accordance with an embodiment of the present invention. As with the embodiment of FIG. 4, flow entrainment structure 24 is spaced apart from gearbox 12, and is mounted on shroud 18 using standoffs 34 and fasteners 36, wherein standoffs 34 are constructed to radially space flow entrainment structure 24 apart from shroud 18. Additional cooling airflow 28 is drawn into flow entrainment structure 24 by cooling airflow 26, as with the embodiment of FIG. 4. Flow entrainment structure 24 admits the additional cooling airflow 28 via a smooth transitioning inlet 44. Inlet 44 includes a smooth transition portion 46 constructed to provide a gradual contraction and reduce pressure losses (in additional cooling airflow 28) that are associated with flow through an otherwise sudden contraction. In one form, smooth transition portion 46 is convex toward gearbox 12, e.g., shroud 18 or external surface 14 in some embodiments. In one form, the gradual contraction forms a converging nozzle. The additional cooling airflow 28 exits flow entrainment structure 24 via outlet 40. The additional cooling airflow 28 is entrained by the cooling airflow 26 discharged from shroud 18, merges with cooling airflow 26, and together with cooling airflow 26 forms combined airflow 32. As with the embodiment of FIG. 4, flow entrainment structure 24 of the embodiment of FIG. 6 entrains additional cooling airflow 28 based on the Coanda effect. Other embodiments may entrain additional cooling airflow 28 based on the Coanda effect and/or the Bernoulli principle and/or the Venturi effect.

Figure 7:
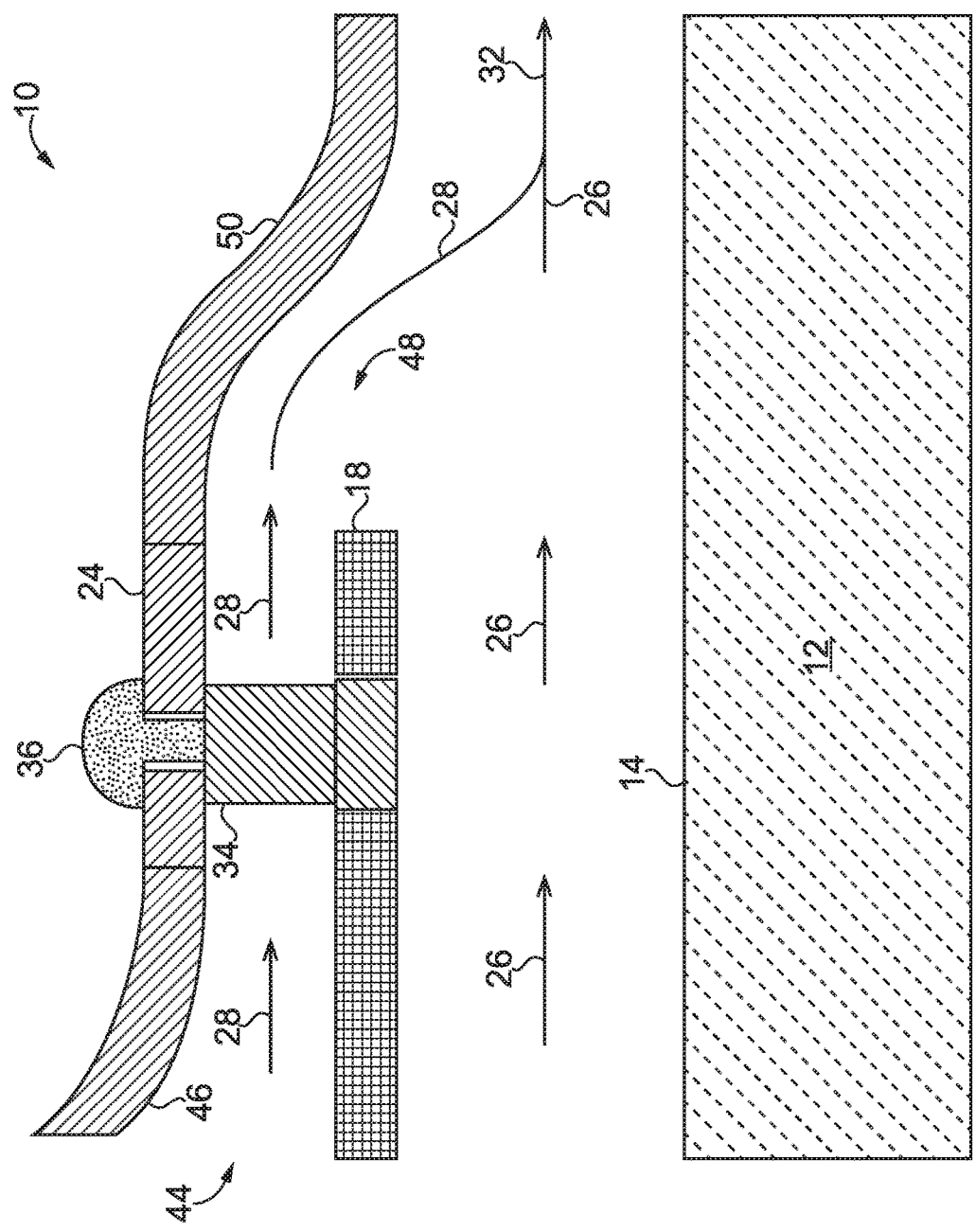
FIG. 7 is a sectional view schematically illustrating some aspects of another non-limiting example of a flow entrainment structure in accordance with an embodiment of the present invention.

Referring also to FIG. 7, some aspects of another non-limiting example of a machine, e.g., gearbox 12, with flow entrainment structure 24 is illustrated in accordance with an embodiment of the present invention. As with the embodiments of FIGS. 4 and 6, flow entrainment structure 24 is spaced apart from gearbox 12, and is mounted on shroud 18 using standoffs 34 and fasteners 36, wherein standoffs 34 are constructed to radially space flow entrainment structure 24 apart from shroud 18. Additional cooling airflow 28 is drawn into flow entrainment structure 24 by cooling airflow 26, as with the embodiment of FIGS. 4 and 6. Flow entrainment structure 24 admits the additional cooling airflow 28 via smooth transitioning inlet 44, which includes smooth transition portion 46 that provides a gradual contraction that helps reduce losses in comparison with flow through a sudden contraction. The additional cooling airflow 28 exits flow entrainment structure 24 via a directional outlet 48. Directional outlet 48 is constructed to direct the additional cooling airflow 28 toward external surface 14. For example, directional outlet 48 includes a directional guide surface 50, which is concave toward gearbox 12, and that is constructed to direct additional cooling airflow 28 toward external surface 14 and into cooling airflow 26, e.g., to mix additional cooling airflow 28 with cooling airflow 26. The additional cooling airflow 28 is entrained by the cooling airflow 26 discharged from shroud 18, merges with cooling airflow 26, and together with cooling airflow 26 forms combined cooling airflow 32, which is directed along external surface 14 for cooling gearbox 12. As with the embodiment of FIGS. 4 and 6, flow entrainment structure 24 of the embodiment of FIG. 7 entrains additional cooling airflow 28 based on the Coanda effect. Other embodiments may entrain additional cooling airflow 28 based on the Coanda effect and/or the Bernoulli principle and/or the Venturi effect.

Figure 8:
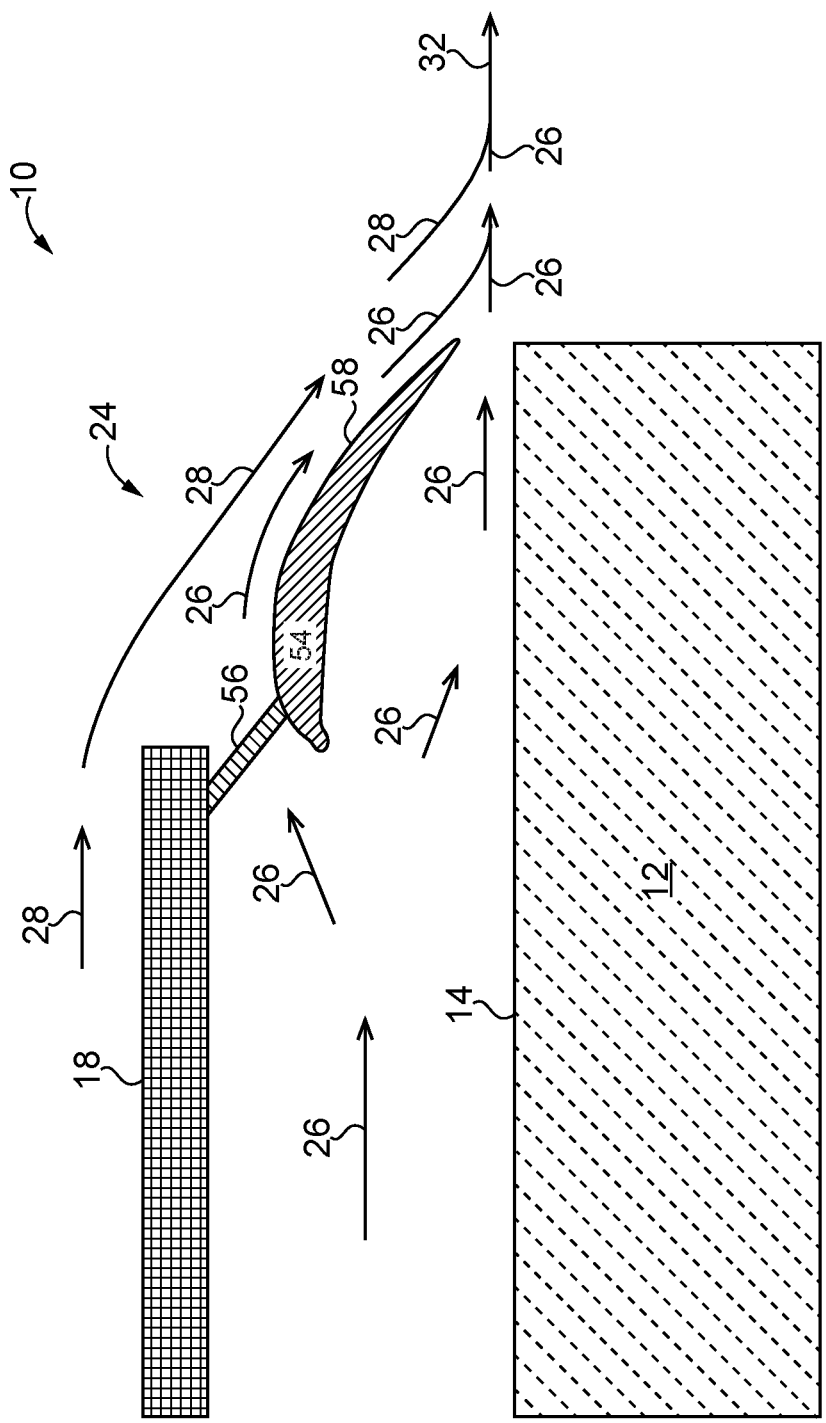
FIG. 8 is a sectional view schematically illustrating some aspects of another non-limiting example of a flow entrainment structure in accordance with an embodiment of the present invention.

Referring also to FIG. 8, some aspects of a non-limiting example of a machine, e.g., gearbox 12 with flow entrainment structure 24, is illustrated in accordance with an embodiment of the present invention. In the embodiment of FIG. 8, flow entrainment structure 24 has an airfoil shape or airfoil-like shape, which may be referred to as an airfoil 54. Airfoil 54 is mounted on shroud 18 and/or on external surface 14. In one form, airfoil 54 is disposed radially between shroud 18 and external surface 14 of gearbox 12. In other embodiments, airfoil 54 may be disposed in other locations. Airfoil 54 is mounted on shroud 18 or on external surface 14 via standoffs 56. Standoffs 56 are affixed to shroud 18 and/or to external surface 14 and airfoil 54, e.g., by welding, brazing or the use of fasteners and/or adhesives. In some embodiments, standoffs 56 may be integral with shroud 18 and/or airfoil 54. Standoffs 56 are constructed to radially space flow entrainment structure 24 apart from shroud 18.

Additional cooling airflow 28 is drawn along flow entrainment structure 24 by cooling airflow 26. Cooling airflow 26 flowing around airfoil 54 and along surface 58 of airfoil 54 creates a low-pressure region, which helps entrain the additional cooling airflow 28 with cooling airflow 26. In the embodiment of FIG. 8, both the Coanda effect and Bernoulli's principle are thus used to entrain the additional cooling airflow 28 with cooling airflow 26. Airfoil 54 is angularly disposed and constructed to direct the additional cooling airflow 28 toward external surface 14 and into cooling airflow 26, e.g., for mixing additional cooling airflow 28 with cooling airflow 26. Airfoil 54 is constructed to merge the additional cooling airflow 28 with cooling airflow 26, forming combined cooling airflow 32, which is directed along external surface 14 for cooling gearbox 12.

Figure 9:
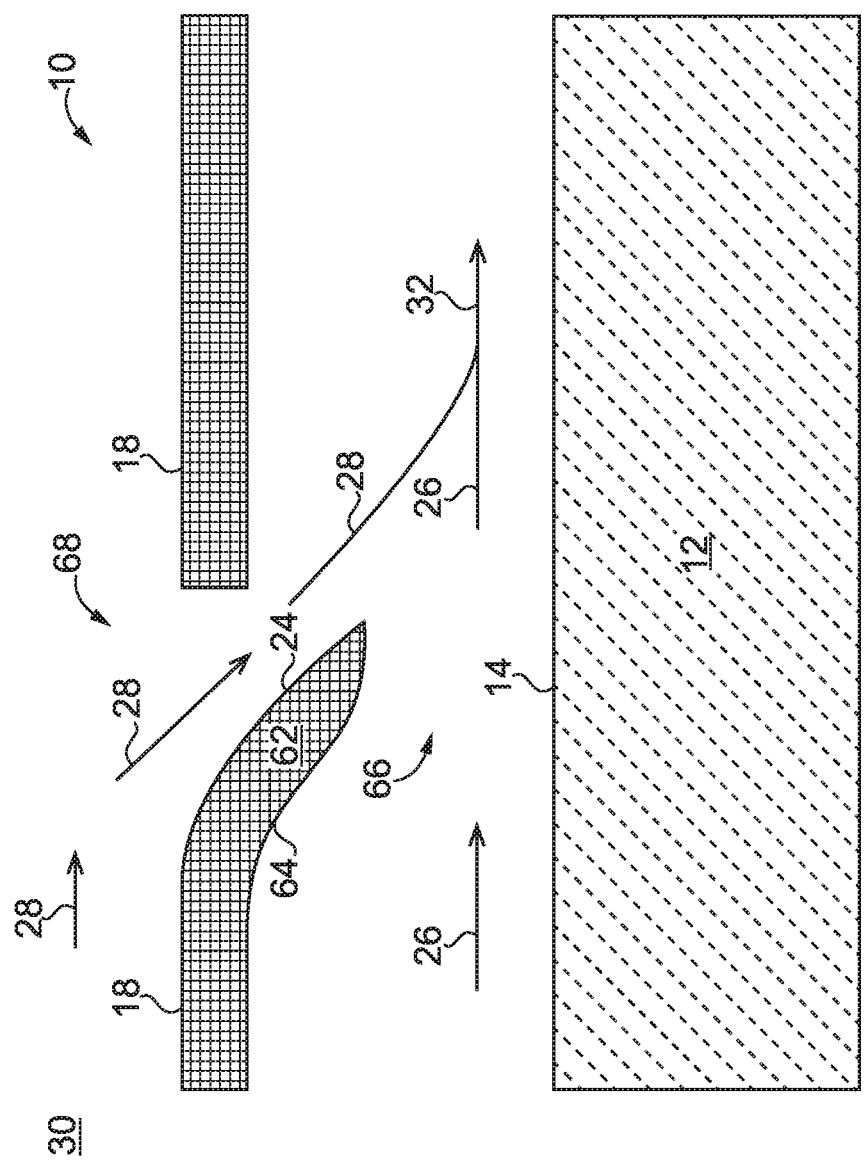
FIG. 9 is a sectional view schematically illustrating some aspects of another non-limiting example of a flow entrainment structure in accordance with an embodiment of the present invention.

Referring also to FIG. 9, some aspects of a non-limiting example of a machine, e.g., gearbox 12 with flow entrainment structure 24, is illustrated in accordance with an embodiment of the present invention. In the embodiment of FIG. 9, flow entrainment structure 24 is in the form of plurality of bent plates or tabs 62 spaced apart from each other along the periphery of shroud 18 (one of which is illustrated in FIG. 9). In other embodiments, tab 62 may be one or more continuous structures. Tab 62 extends from shroud 18, and is spaced apart from external surface 14 of gearbox 12. In other embodiments, tab 62 may extend from external surface 14 and be spaced apart from tab 62. In one form, tab 62 is integral with shroud 18. In other embodiments, tab 62 may affixed to shroud 18, e.g., via welding, brazing or the use of fasteners and/or adhesives. Tab 62 includes a ramp 64 forming a nozzle and culminating in a throat 66 defined as the minimum flow area between tab 62 and external surface 14 of gearbox 12. Adjacent to tab 62 is a slot or opening 68 for admitting additional cooling airflow 28.

As the flow of cooling air 26 approaches throat 66, it increases in velocity because of the nozzle formed by ramp 64. The increase in velocity results in a reduction in static pressure at and immediately downstream of throat 66, e.g., based on the Venturi effect manifestation of Bernoulli's principle. The low-pressure draws in additional cooling airflow 28 through opening 68. The additional cooling airflow 28 may also or alternatively be drawn in through opening 68 by the Coanda effect. The additional cooling airflow 28 is drawn along flow entrainment structure 24, i.e., tab 62, by cooling airflow 26, and is directed radially inward toward cooling airflow 26 and external surface 14. The additional cooling airflow 28 merges or mixes with cooling airflow 26 and forms combined cooling airflow 32, which is thus directed along external surface 14, extracting heat therefrom, and cooling gearbox 12.

Embodiments of the present invention include a system, comprising: a machine having an external surface; a cooling airflow generator constructed to generate a cooling airflow when rotated; a flow guide structure operative to guide the cooling airflow and discharge the cooling airflow over the external surface and cool the machine using the cooling airflow, wherein at least a portion of the flow guide structure is spaced apart from the machine and disposed radially outward of the external surface; and a flow inducer coupled to the machine and/or the flow control structure, wherein the flow inducer is constructed to entrain additional cooling airflow from an environment in which the machine is located.

In a refinement, the flow inducer is mounted on the flow guide structure.

In another refinement, the system further comprises a plurality of standoffs constructed to space the flow inducer apart from the guide structure.

In yet another refinement, the flow inducer is operative to entrain the additional cooling airflow using the cooling airflow discharged from the flow guide structure, and to provide additional cooling to the machine using the additional cooling airflow.

In still another refinement, the flow entrainment structure includes an inlet; wherein the inlet includes a smooth transition portion constructed to reduce pressure losses in the additional cooling airflow.

In yet still another refinement, the flow inducer is integral with the flow guide structure.

In a further refinement, the flow inducer is a flat plate.

In another further refinement, the flow inducer has an airfoil shape.

In yet another further refinement, the flow inducer includes an outlet constructed to direct the additional cooling airflow toward the external surface.

In still another further refinement, the flow inducer is constructed to entrain the additional cooling airflow using the Coanda effect and/or the Bernoulli principle.

Embodiments of the present invention include a system, comprising, a gearbox having an external surface; a fan or impeller constructed to generate a first cooling airflow when rotated; a shroud operative to guide the cooling airflow and discharge the first cooling airflow over the external surface, wherein at least a portion of the shroud is spaced apart from the gearbox and disposed radially outward of the external surface; and a flow entrainment structure coupled to the gearbox and/or the shroud, wherein the flow entrainment structure is constructed to entrain second cooling airflow from an environment in which the gearbox is located and combine the second cooling airflow with the first cooling airflow to form a combined cooling airflow, wherein the combined cooling airflow is directed across the external surface to cool the gearbox.

In a refinement, the flow entrainment structure is mounted on the shroud, and is operative to entrain the second cooling airflow using the first cooling airflow discharged from the shroud.

In another refinement, the system further comprises a plurality of standoffs constructed to space the flow entrainment structure apart from the shroud.

In yet another refinement, the flow entrainment structure includes an inlet; and wherein the inlet includes a smooth transition portion constructed to reduce pressure losses in the additional cooling airflow.

In still another refinement, the flow entrainment structure is spaced apart radially and externally from the shroud.

In yet still another refinement, the flow entrainment structure is integral with the shroud.

In a further refinement, the flow entrainment structure is a flat plate.

In a yet further refinement, the flow entrainment structure has an airfoil shape.

In a still further refinement, the flow entrainment structure includes an outlet constructed to direct the second cooling airflow toward the external surface.

In a yet still further refinement, the flow entrainment structure is constructed to entrain the second cooling airflow using the Coanda effect and/or the Bernoulli principle.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system, comprising:
a machine having an external surface;
a cooling airflow generator constructed to generate a cooling airflow when rotated;
a flow guide structure to guide the cooling airflow and discharge the cooling airflow over the external surface and cool the machine using the cooling airflow, wherein at least a portion of the flow guide structure is spaced apart from the machine and disposed radially outward of the external surface so the cooling airflow is guided between the machine and the flow guide structure; and
a flow inducer mounted to the flow guide structure so that the flow inducer is radially spaced outwardly of the flow guide structure, wherein the flow inducer includes an inlet to admit additional cooling airflow from an environment in which the machine is located and into a space between the flow guide structure and the flow inducer, and the flow inducer includes an outlet in which the additional cooling airflow exits the space and is entrained into the cooling airflow discharged from the flow guide structure to form a combined cooling airflow that is directed across the external surface of the machine.

2. The system of claim 1, further comprising a plurality of standoffs constructed to space the flow inducer apart from the guide structure.

3. The system of claim 1, wherein the flow inducer is operative to entrain the additional cooling airflow using the cooling airflow discharged from the flow guide structure, and to provide additional cooling to the machine using the additional cooling airflow.

4. The system of claim 1, wherein the inlet includes a smooth transition portion constructed to reduce pressure losses in the additional cooling airflow.

5. The system of claim 1, wherein the flow inducer is integral with the flow guide structure.

6. The system of claim 1, wherein the flow inducer is a flat plate.

7. The system of claim 1, wherein the flow inducer has an airfoil shape.

8. The system of claim 1, wherein the flow inducer includes an outlet constructed to direct the additional cooling airflow toward the external surface.

9. The system of claim 1, wherein the flow inducer is constructed to entrain the additional cooling airflow using the Coanda effect and/or the Bernoulli principle.

10. A system, comprising,
a gearbox having an external surface;
a fan or impeller constructed to generate a first cooling airflow when rotated;
a shroud to guide the first cooling airflow and discharge the first cooling airflow over the external surface, wherein at least a portion of the shroud is spaced apart from the gearbox and disposed radially outward of the external surface so the first cooling airflow is guided between the gearbox and the shroud; and
a flow entrainment structure mounted on the shroud so that the flow entrainment structure is radially spaced outwardly of the shroud, wherein the flow entrainment structure includes an inlet to admit a second cooling airflow from an environment in which the gearbox is located and into a space between the shroud and the flow entrainment structure, and the flow entrainment structure includes an outlet in which the second cooling airflow exits the space and is entrained into the first cooling airflow discharged from the shroud to combine the second cooling airflow with the first cooling airflow to form a combined cooling airflow,
wherein the combined cooling airflow is directed across the external surface to cool the gearbox.

11. The system of claim 10, further comprising a plurality of standoffs constructed to space the flow entrainment structure apart from the shroud.

12. The system of claim 10, wherein the inlet includes a smooth transition portion constructed to reduce pressure losses in the second cooling airflow.

13. The system of claim 10, wherein the flow entrainment structure is integral with the shroud.

14. The system of claim 10, wherein the flow entrainment structure is a flat plate.

15. The system of claim 10, wherein the flow entrainment structure has an airfoil shape.

16. The system of claim 10, wherein the flow entrainment structure includes an outlet constructed to direct the second cooling airflow toward the external surface.

17. The system of claim 10, wherein the flow entrainment structure is constructed to entrain the second cooling airflow using the Coanda effect and/or the Bernoulli principle.

* * * * *